United States Patent
Schneider et al.

(10) Patent No.: US 9,239,106 B2
(45) Date of Patent: Jan. 19, 2016

(54) METHOD FOR RUNNING A DRIVE LINE

(75) Inventors: Florian Schneider, Lindenberg (DE);
Roland Mair, Tettnang (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 321 days.

(21) Appl. No.: 13/039,946

(22) Filed: Mar. 3, 2011

(65) Prior Publication Data

US 2011/0224855 A1      Sep. 15, 2011

(30) Foreign Application Priority Data

Mar. 10, 2010 (DE) .......................... 10 2010 002 725

(51) Int. Cl.
| | |
|---|---|
| B60K 6/36 | (2007.10) |
| F16H 59/00 | (2006.01) |
| F16H 61/04 | (2006.01) |
| B60K 17/28 | (2006.01) |
| B60W 10/30 | (2006.01) |
| B60W 30/188 | (2012.01) |
| F16H 3/093 | (2006.01) |
| F16H 37/04 | (2006.01) |
| F16H 3/12 | (2006.01) |

(52) U.S. Cl.
CPC ............ *F16H 61/0403* (2013.01); *B60K 17/28* (2013.01); *B60W 10/30* (2013.01); *B60W 30/1888* (2013.01); *F16H 3/093* (2013.01); *F16H 37/046* (2013.01); *F16H 2003/123* (2013.01)

(58) Field of Classification Search
CPC ................ F16H 61/0403; F16H 3/093; F16H 2003/123; B60K 17/28; B60W 30/1888
USPC ......................... 477/109; 701/22, 51; 903/902
See application file for complete search history.

(56) References Cited

U.S. PATENT DOCUMENTS

| | | | |
|---|---|---|---|
| 5,489,247 A | | 2/1996 | Markyvech et al. |
| 2006/0116238 A1* | | 6/2006 | Karlsson et al. .............. 477/109 |
| 2009/0171542 A1* | | 7/2009 | Sugiura et al. ................. 701/52 |

FOREIGN PATENT DOCUMENTS

DE        102005048893 A1    4/2007

OTHER PUBLICATIONS

European Search Report issued in European Application No. 11154268.4, dated May 23, 2011 (including English translation of result of determination of document) (6 pages).

* cited by examiner

*Primary Examiner* — Redhwan K Mawari
*Assistant Examiner* — Rodney P King
(74) *Attorney, Agent, or Firm* — Brinks Gilson & Lione

(57) ABSTRACT

A method for operating a powertrain of a motor vehicle may comprise: providing a powertrain comprising an automatic transmission arranged between a drive unit and an axle drive, wherein an input shaft of the automatic transmission is connected with the drive unit by means of a controllable clutch and an output shaft is connected with the axle drive, and wherein the powertrain comprises also a gearbox-sided, transient auxiliary drive that is selectively connected for activating or engaging a gearbox-sided connecting point or disconnected for deactivating or disengaging from the connecting point; determining, when the gearbox-sided transient auxiliary output is activated or engaged, a load to be borne at the performance of a gearshift; and specifying, depending on the determined load, whether the gearshift is going to be performed and what synchronous elements of the powertrain are being used to perform the gearshift.

9 Claims, 3 Drawing Sheets

METHOD FOR RUNNING A DRIVE LINE

RELATED APPLICATIONS

The present application claims priority to German Patent Application Number 10 2010 002 725.1, filed on Mar. 10, 2010, the entirety of which is hereby incorporated by reference herein.

BACKGROUND OF THE INVENTION

1. Field of the Invention

The invention concerns a method for operating a powertrain, which comprises at least a drive unit and an automatic transmission.

2. Description of the Related Art

Automatic transmissions which are designed as range change transmissions and which have a multi-stage main gearbox and a range change group connected upstream or downstream of the main gearbox, as well as a splitter group connected upstream or downstream of the main gearbox have been known for many years and are preferably used in commercial vehicles. For example, by means of a two-stage splitter group which has a gear ratio step that corresponds to approximately half of a medium transmission stage between two sequential transmission stages of the main gearbox, the gear ratio steps of the main gearbox are divided in half which doubles the total number of available gears of the range change transmission. For example, by means of a two-stage range change group which has a gear ratio step that lies approximately by a medium gear ratio step between two sequential transmission stages across the entire gear ratio step of the main gearbox, the spread of the range change transmission is approximately doubled and the total number of available gears is again doubled.

Also known are automatic transmissions that have only one main gearbox. The splitter group and the range change group are therefore optional subassemblies of an automatic transmission, whereas it is possible to connect a range change group and/or a splitter group upstream or downstream of the main gearbox. Automatic transmissions comprising interlocking shift elements are different from automatic powershift transmissions comprising friction-locked shift elements.

Furthermore, it is known that such a powertrain of a motor vehicle with an automatic transmission can comprise an auxiliary output, whereas an auxiliary output can also be described as a power take off (PTO). In the context of auxiliary outputs a difference is made, on the one hand, between gearbox-sided and motor-sided auxiliary outputs and, on the other hand, between stationary and transient auxiliary outputs.

A motor-sided auxiliary output branches off a moment directly from the drive unit, whereas a gearbox-sided auxiliary output branches off a moment from the transmission. Stationary auxiliary outputs can be operated only when the motor vehicle is stationary, that is, when the automatic transmission is in neutral position, or when the power flow or torque flow from the drive unit to the axle drive is interrupted. Transient auxiliary outputs, on the other hand, can also be operated when a gear is engaged, that is, when the power flow or torque flow from the drive unit to the axle drive is not interrupted.

To date, it is possible only in a stationary motor vehicle to engage and thus activate a transient, gearbox-sided auxiliary output of such a powertrain of a motor vehicle having an automatic transmission. Furthermore, up to now, shifting is prevented when a gearbox-sided, transient auxiliary output is engaged or activated. As a result, driving is possible only in a single gear and, consequently, only in a limited speed range. Since, according to prior art, a gearbox-sided, transient auxiliary output can be engaged or activated only when the motor vehicle is stationary, the gear used must be a relatively low gear, namely a starting gear, because it has to be possible to start from a standstill.

The present invention concerns a method for operating a powertrain with an automatic transmission and a gearbox-sided, transient auxiliary output, in which it is possible to shift and, consequently, change gears when the gearbox-sided, transient auxiliary output is engaged and thus activated.

DE 10 2005 048 893 A1 has already disclosed a method for operating a powertrain with an automatic transmission and an auxiliary output, in which it is possible to perform a gearshift, or change of gears, when the auxiliary output is connected and thus engaged. In doing so it is imperative to synchronize by means of the drive unit via the clutch an input shaft of the automatic transmission.

SUMMARY OF THE INVENTION

On this basis, the present invention relates to the challenge of providing a new method of operating a powertrain of a motor vehicle. According to an embodiment of the invention, a method for operating a powertrain of a motor vehicle, the method may comprise: providing a powertrain comprising an automatic transmission arranged between a drive unit and an axle drive, wherein an input shaft of the automatic transmission is connected with the drive unit by means of a controllable clutch and an output shaft is connected with the axle drive, and wherein the powertrain comprises also a gearbox-sided, transient auxiliary drive that is selectively connected for activating or engaging a gearbox-sided connecting point or disconnected for deactivating or disengaging from the connecting point; determining, when the gearbox-sided transient auxiliary output is activated or engaged, a load to be borne at the performance of a gearshift; and specifying, depending on the determined load, whether the gearshift is going to be performed and what synchronous elements of the powertrain are being used to perform the gearshift.

According to another embodiment of the invention, in order to perform a gearshift in an automatic transmission when the gearbox-sided, transient auxiliary output is activated or engaged, a load to be borne at the performance of the gearshift is determined whereas, depending on the determined load, it is specified whether the gearshift is going to be performed and what synchronous elements of the powertrain are being used to perform the gearshift.

With this embodiment, it is proposed for the first time to design a gearshift in an automatic transmission in such a way that, depending on the load to be borne when performing a gearshift, the gearshift can be performed when the gearbox-sided, transient auxiliary output is activated or engaged. According to the this embodiment, depending on the load to be borne when performing the gearshift, it is specified whether the gearshift is going to be performed and what synchronous elements of the powertrain are being used to perform the gearshift.

According to another embodiment of the invention, if the load to be borne when performing the gearshift can be borne by a transmission brake of the automatic transmission at least the transmission brake should be used as synchronous element for performing the gearshift.

However, if the load to be borne when performing the gearshift cannot be borne by a transmission brake of the automatic transmission at least the drive unit and possibly the clutch is used as synchronous element for performing the gearshift.

However, if the load to be borne when performing the gearshift cannot be borne by either a transmission brake of the automatic transmission or the drive unit and possibly the clutch, the gearshift will not be permitted.

The load to be borne when performing the gearshift may be determined depending on the load generated when the gearbox-sided, transient auxiliary output is activated or engaged, as well as depending on the driving conditions and/or depending on the driver's request.

The foregoing paragraphs have been provided by way of general introduction, and are not intended to limit the scope of the following claims.

BRIEF DESCRIPTION OF THE DRAWINGS

The embodiments described below may be more fully understood by reading the following description in conjunction with the drawings, in which.

DETAILED DESCRIPTION

The present invention concerns a method for operating a powertrain with an automatic transmission and a gearbox-sided, transient auxiliary output.

Figure 1:
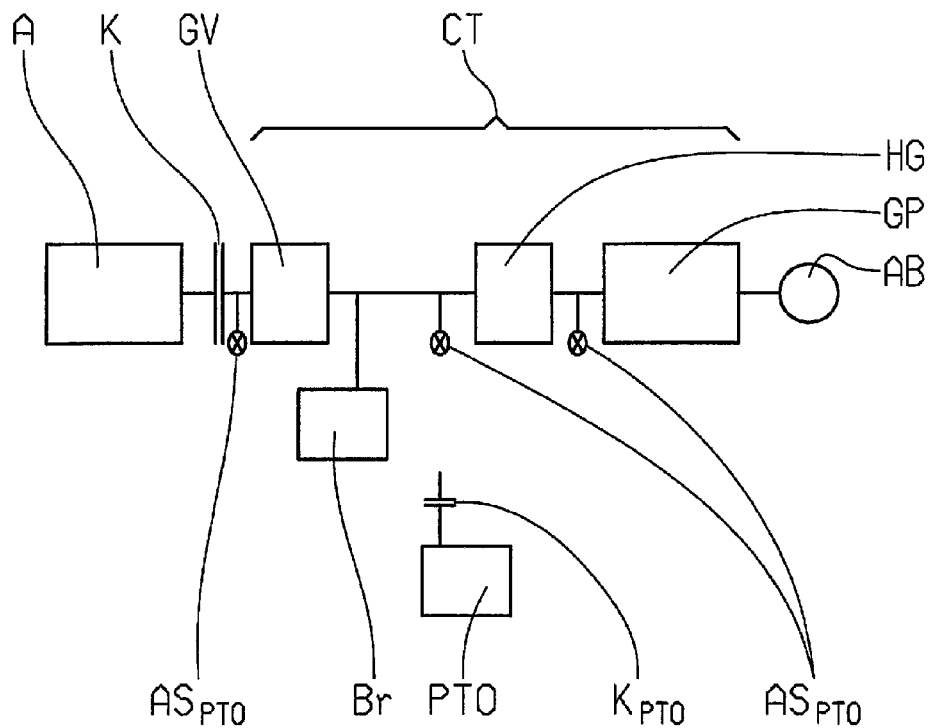
FIG. 1 is a general diagram of a powertrain for use in an embodiment of the present invention.

FIG. 1 shows a basic diagram of a powertrain graph in which the an embodiment of the present invention can be used, whereas FIG. 1 shows a drive unit A and an axle drive AB with an automatic transmission that is interconnected between the drive unit A and the axle drive AB and that is designed as a range change transmission CT.

The automatic transmission which in FIG. 1 is designed as a range change transmission CT has, according to FIG. 1, a main gearbox HG, a front-mounted range change unit or splitter group GV which is drive-connected upstream of the main gearbox HG, and a rear-mounted range change unit or range change group GP which is drive-connected downstream of the main gearbox HG. Interconnected between the drive unit A and the range change transmission CT is a clutch or starting clutch K, by means of which the drive unit A can be disconnected from the range change transmission CT. Furthermore, FIG. 1 shows a controllable transmission brake Br, as well as a gearbox-sided auxiliary output PTO to which a clutch $K_{PTO}$ has been attached. At the same time, the gearbox-sided auxiliary output PTO is designed as a transient auxiliary output and can be connected to different connecting points $AS_{PTO}$ of the range change transmission CT. The connecting points $AS_{PTO}$ are attached to shafts of the range change transmission CT.

Figure 2:
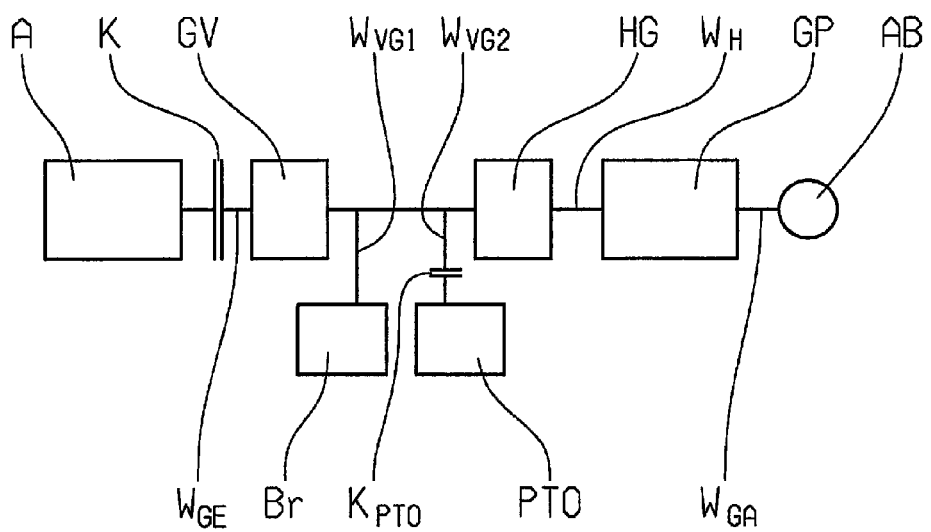
FIG. 2 illustrates a second embodiment of the powertrain of FIG. 1.

In the embodiment shown in FIG. 2, the gearbox-sided, transient auxiliary output PTO is connected to one of the connecting points $AS_{PTO}$ for the auxiliary output (shown in FIG. 1), i.e., to a connecting point that is drive-connected between the splitter group GV and the main gearbox HG.

Figure 3:
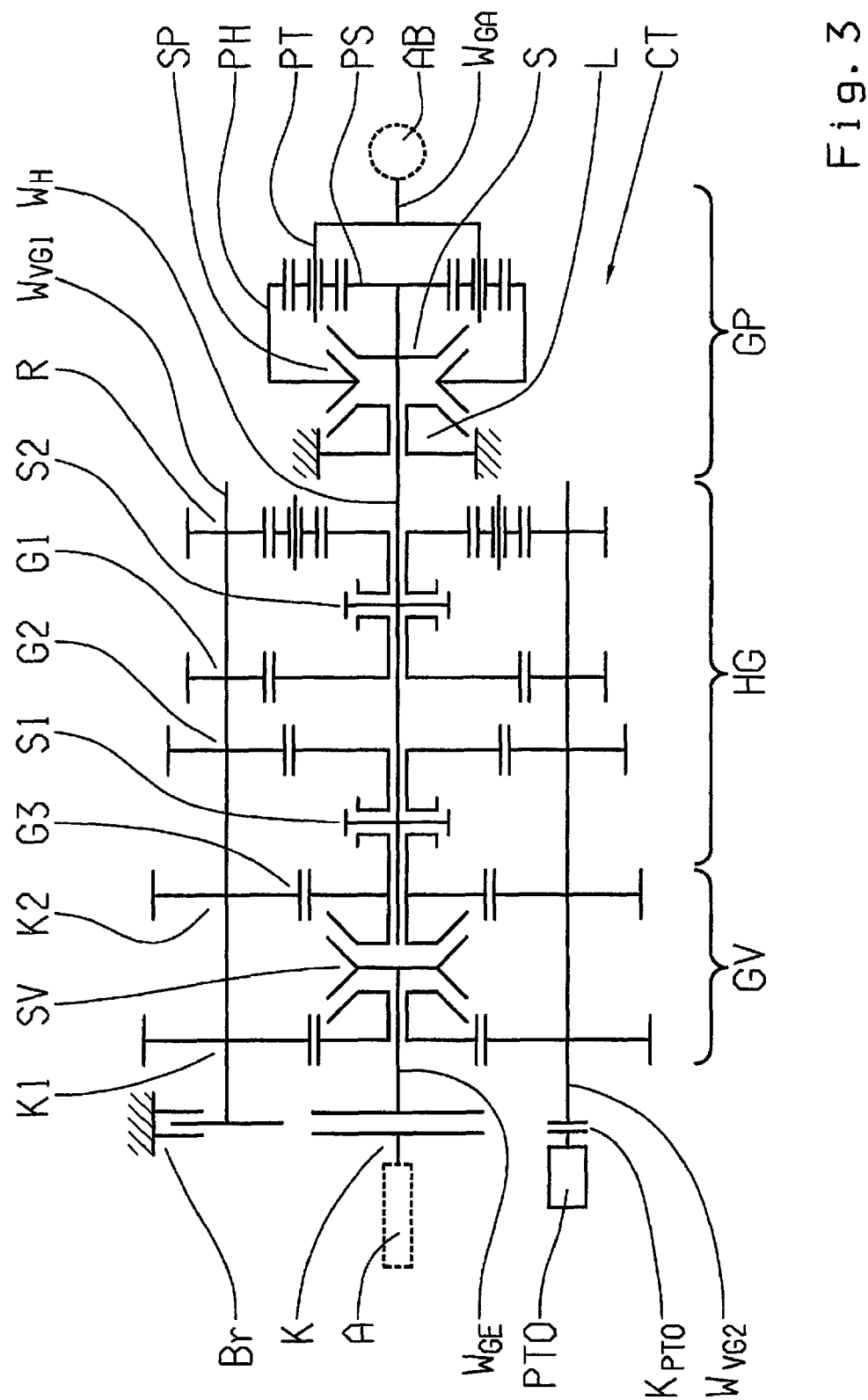
FIG. 3 illustrates the powertrain of FIG. 2 in more detail.

FIG. 3 shows the powertrain of FIG. 2 in more detail, whereas the range change transmission CT shown in FIG. 3 involves a range change transmission of the so-called AS Tronic family manufactured by ZF Freidrichshafen, the assignee of the present application.

The main gearbox HG of the range change transmission CT shown in FIG. 3 is designed as direct gear transmission constructed in countershaft transmission style, comprising a main shaft $W_H$ and two counter shafts $W_{VG1}$ and $W_{VG2}$. The first counter shaft $W_{VG1}$ is provided with the controllable transmission brake Br, and the gearbox-sided, transient auxiliary output PTO can be connected to the second counter shaft $W_{VG2}$ or disconnected from it.

The main gearbox HG shown in FIG. 3 has a three-stage design with three transmission stages G1, G2 and G3 for forward motion and one transmission stage R for reverse motion. Idle wheels of the transmission stages G1, G2 and R are each pivoted on the main shaft $W_H$ and can be shifted via attached jaw clutches. The attached fixed gearwheels are non-rotatably arranged on the counter shafts $W_{VG1}$ and $W_{VG2}$. The highest transmission stage G3 of the main gearbox HG designed as direct gear can be shifted by means of a direct shift clutch. The clutches of the transmission stages G3 and G2, as well as the clutches of the transmission stages G1 and R are each designed as jaw clutches and are combined in a mutual shifting group S1 or S2. The main gearbox HG may be connected in non-synchronized manner.

The front-mounted range change unit or splitter group GV of the range change transmission CT shown in FIG. 3 has a two-stage design and is constructed in countershaft transmission style. At the same time, both transmission stages K1 and K2 of the front-mounted range change unit GV form two shiftable input constants of the main gearbox HG. Because of the fact that the two transmission stages K1, K2 have a minor gear ratio difference, the front-mounted range change unit GV is designed as splitter group. The idle wheel of the first transmission stage K1 is pivoted on the input shaft $W_{GE}$, which is connected via a controllable clutch K with a drive unit A (drawn with a dotted line) that is designed as a combustion motor and that is not part of the range change transmission. The idle wheel of the second transmission stage K2 is pivoted on the main shaft $W_H$. The fixed gearwheels of both transmission stages K1, K2 of the front-mounted range change unit GV are each arranged in a rotationally fixed manner with the countershafts $W_{VG1}$ and $W_{VG2}$ of the main gearbox, which countershafts are extended on the input side. The synchronized clutches of the front-mounted range change unit GV which are designed as jaw clutches are combined in a mutual shifting group SV.

The range change group GP of the range change transmission CT shown in FIG. 3, which is arranged downstream of the main gearbox HG, also has a two-stage design, but is constructed in a planetary design having a simple planetary gear set. The sun wheel PS is non-rotatably connected with the main shaft $W_H$ of the main gearbox HG, which main shaft is extended on the output side. The planetary carrier PT is non-rotatably connected with the output shaft $W_{GA}$ of the range change transmission CT which, in turn, is connected with an axle drive AB (drawn with a dotted line). The ring gear PH is connected with a shifting group SP having two synchronized clutches which are designed as jaw clutches. By means of these clutches, the range change group GP can be alternately shifted to a low range L, by connecting the ring gear PH with the stationary housing, and to a high range S, by connecting the ring gear PH with the main shaft WH or the sun wheel PS. The range change group GP can be shifted in synchronized manner.

With this embodiment, it is possible, if a powertrain has an automatic transmission and a gearbox-sided, transient auxiliary output PTO, to efficiently shift the automatic transmission when the gearbox-sided, transient auxiliary output is activated or engaged.

At this point it should be emphasized that this embodiment is not limited to the applications of the powertrains shown in FIGS. 1 to 3. For example, this method may also be used if a powertrain with an automatic transmission and a gearbox-sided, transient, auxiliary output has different configurations.

Figure 4:
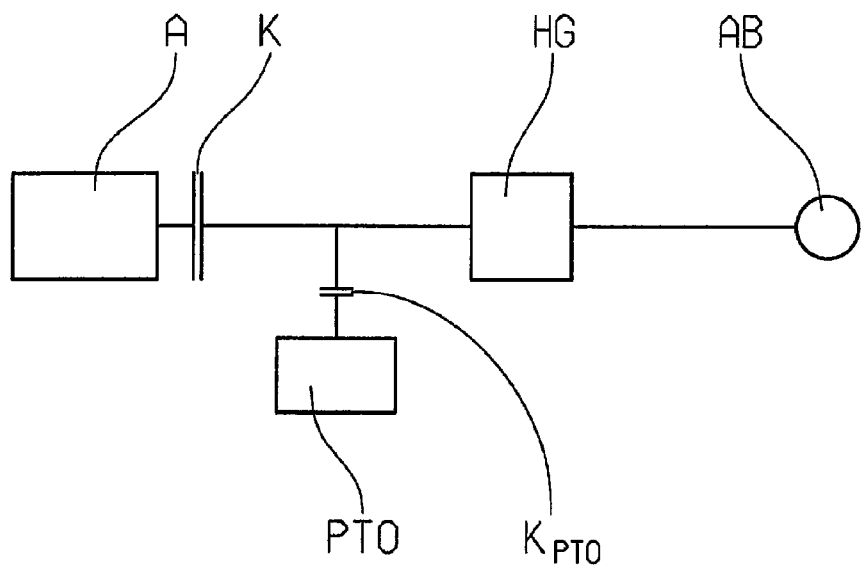
FIG. 4 illustrates a third embodiment of a powertrain.

For example, the invention can also be used with the powertrain shown in FIG. 4, in which the automatic transmission has only a main gearbox HG and does not have a splitter group GV or a range change group GP. In addition, this method may also be used with the powertrain shown in FIG. 5, in which again the automatic transmission has only a main gearbox HG (corresponding to FIG. 4) but the drive unit A is designed as a hybrid drive which has an electric motor in addition to a combustion motor VM. According to FIG. 5, the electric motor is downstream drive-connected to the starting clutch.

To perform a gearshift in the automatic transmission with the powertrains shown in FIGS. 1 to 5 when the gearbox-sided, transient auxiliary output is activated or engaged, a load or forces and moments to be borne when the gearshift is performed have to be determined and, depending on the determined load, it is specified whether the gearshift is going to be performed and what synchronous elements of the powertrain are being used to perform the gearshift.

Then, when the load to be borne at the performance of the gearshift can be borne by the transmission brake Br of the automatic transmission, the transmission brake Br is used a synchronous element to perform the gearshift when the gearbox-sided, transient auxiliary output is engaged. The performance of gearshifts using the transmission brake when the auxiliary output PTO is not engaged is known to those of skill in the art, and therefore, no further explanation of this aspect is included in the present application. Gearshifts using the transmission brake when the auxiliary output PTO is engaged are performed analogously.

Figure 5:
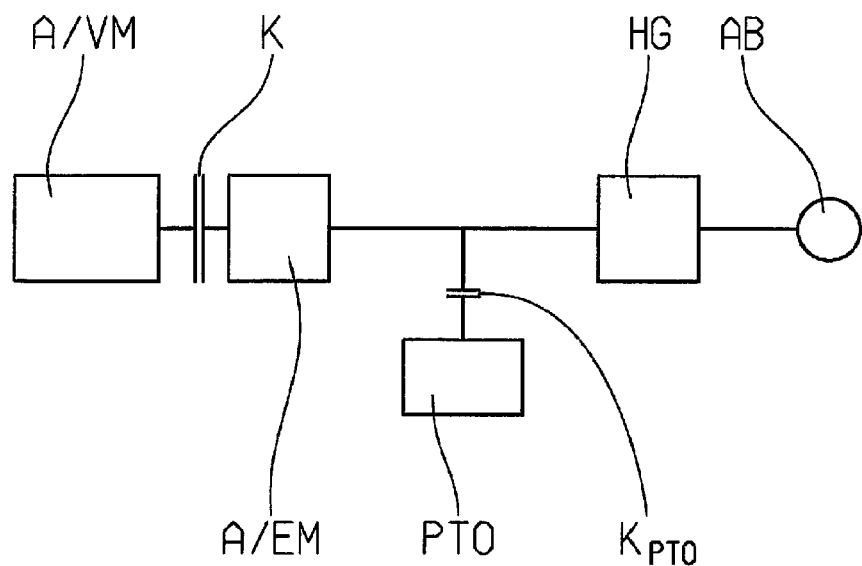
FIG. 5 illustrates a fourth embodiment of a powertrain.

However, if the load to be borne when performing a gearshift cannot be borne by the transmission brake Br or if no transmission brake is available, as is the case in the examples shown in FIGS. 4 and 5, at least the drive unit A and possibly the clutch K is used as synchronous element to perform the gearshift.

However, if the load to be borne when performing a gearshift cannot be borne by either the transmission brake Br or the drive unit A, and possibly the clutch K, it will not be permitted to perform a gearshift.

The load to be borne when performing a gearshift is determined depending on the load generated when the gearbox-sided, transient auxiliary output is activated or engaged, as well as depending on the driving conditions and/or depending on a driver's request.

The driver's request depends on an activation of the accelerator pedal from which a desired shifting speed and a desired shifting comfort can be derived.

For example, driving conditions to take into consideration can involve an inclination of the roadway on which the motor vehicle is operated. In this case, it can be arranged that a gearshift in the automatic transmission when the gearbox-sided transient auxiliary output PTO is activated is permitted only if the inclination of the roadway is smaller than an applicable limit value.

If, based on the determined load to be borne when performing the gearshift, the gearshift is performed using the drive unit A and possibly the clutch K and if, as indicated in the embodiments shown in FIGS. 1 to 4, the drive unit A is designed as a combustion motor which is connected with the input shaft of the automatic transmission by means of the clutch K, the gearshift in the automatic transmission using the drive unit A designed as a combustion motor and using the clutch K is performed in such a way that, initially, the automatic transmission is transferred to a neutral position and the clutch K is opened.

Preferably, the automatic transmission in the embodiments shown in each of FIGS. 1 to 4 is transferred to a neutral position in such a way that the main gearbox HG is transferred to the neutral position.

Subsequently, in neutral position of the transmission, the drive unit A designed as a combustion motor is tuned to a target speed of a target gear to be engaged and, at the same time, by closing the slip clutch K, the synchronous operation of the target gear is produced in the automatic transmission. As a result, the clutch K is loaded.

Alternatively it is possible to perform the gearshift using the drive unit A designed as a combustion motor, as well as using the clutch K as synchronous elements in such a way that initially the automatic transmission, especially the main gearbox HG of the automatic transmission, is transferred to a neutral position and the clutch K is opened, whereas, subsequently, in the neutral position of the automatic transmission with an opened clutch K, the drive unit A is tuned to the current speed of the input shaft of the automatic transmission and the slip clutch is closed only at this point. Afterwards, the drive unit A or the combustion motor is tuned to a target speed of the target gear of the gearshift in order to perform the synchronous operation of the target gear in the automatic transmission.

This process has the advantage that the clutch K is to a large extent protected.

If the drive unit A is designed as a hybrid drive, as indicated in the powertrain shown in FIG. 5, comprising a combustion motor VM and an electric motor EM, the gearshift using the drive unit A can be performed in such a way that initially the automatic transmission is transferred to a neutral position and the clutch K is opened. Subsequently, in the neutral position of the transmission with opened clutch K, the synchronous operation of the target gear is achieved in the automatic transmission by means of the electric motor EM in that the electric motor EM is tuned to the target speed of the target gear of the gearshift.

In this case, synchronization is performed using the electric motor EM of the drive unit A designed as a hybrid drive.

As a result, it is possible by means of this embodiment to select appropriate synchronous elements of the powertrain to perform a gearshift depending on the design of the drive unit A, as well as depending on the design of the automatic transmission, as well as depending on the load to be borne when performing a gearshift, which load is depending on the load of the gearbox-sided, transient auxiliary output PTO.

If gear synchronization by means of the transmission brake is not suitable to perform synchronization for a gear change when the gearbox-sided, transient auxiliary output PTO is engaged, the synchronization is performed by means of the drive unit A and possibly the clutch K. If the load to be borne during a gearshift cannot be borne even with the drive unit A and the clutch K, the gearshift is suppressed.

Preferably it is indicated to the driver whether or not it is possible to perform a gearshift when the gearbox-sided, transient auxiliary output PTO is engaged in order to ensure that the driver can understand the performance of the powertrain.

While preferred embodiments have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the features described above are not necessarily the only features of the invention, and it is not necessarily expected that all of the described features will be achieved with every embodiment of the invention.

The invention claimed is:

1. A method for operating a powertrain of a motor vehicle, the method comprising:
   operating a powertrain, the powertrain comprises:
      an automatic transmission arranged between a drive unit and an axle drive, wherein an input shaft of the automatic transmission is connected with the drive unit by a controllable clutch and an output shaft of the automatic transmission is connected with the axle drive, and
      a gearbox-sided auxiliary output that is selectively connected for activating or engaging a gearbox-sided connecting point or disconnected for deactivating or disengaging from the connecting point;
   determining, based on a load of the powertrain when the gearbox-sided auxiliary output is activated or engaged, a load to be borne by the powertrain when performing a target gearshift to a target gear;
   determining, based on the determined load, a first set of synchronous elements of the powertrain for a first gearshift procedure and a second set of synchronous elements of the powertrain for a second gearshift procedure different from the first gearshift procedure; and
   conducting the target gearshift to the target gear based on whether a transmission brake is capable of bearing the determined load when the gearbox-side auxiliary output is engaged;
   wherein the target gearshift is conducted through the first gearshift procedure with the first set of synchronous elements when a transmission brake is capable of bearing the determined load and the gearbox-sided auxiliary output is engaged; and
   wherein the target gearshift is conducted through the second gearshift procedure with the second set of synchronous elements when the transmission brake is not capable of bearing the determined load.

2. A method according to claim 1, wherein the determination of the load to be borne depends on at least one of:
   a load generated when the gearbox-sided auxiliary output is activated or engaged,
   driving conditions, and
   a driver's request.

3. A method according to claim 1, wherein the transmission brake is a synchronous element for performing the first gearshift procedure.

4. A method according to claim 1, wherein at least one of the drive unit and the clutch is a synchronous element for performing the second gearshift procedure.

5. A method according to claim 4, wherein the drive unit is a combustion motor connected to the input shaft of the automatic transmission by the clutch, and
   conducting the second gearshift procedure comprises:
      transferring the automatic transmission to a neutral position; and
      opening the clutch,
      tuning the combustion motor to a target speed of a target gear to be engaged; and
      closing the clutch simultaneously to the tuning of the combustion motor.

6. A method according to claim 4, wherein the drive unit is a combustion motor connected to the input shaft of the automatic transmission by the clutch, and
   conducting the second gearshift procedure comprises:
      transferring the automatic transmission to a neutral position,
      opening the clutch,
      tuning the combustion motor to a current speed of the input shaft,
      closing the clutch simultaneously to the tuning of the combustion, and
      tuning the combustion motor to a target speed of a target gear of the target gearshift after closing the clutch.

7. A method according to claim 4, wherein the drive unit is designed as a hybrid drive that comprises a combustion motor connected to the input shaft of the automatic transmission by the clutch, and an electric motor that is downstream drive-connected to the clutch, and
   conducting the second gearshift procedure comprises:
      transferring the automatic transmission to a neutral position;
      opening the clutch, and
      tuning the electric motor to a target speed of a target gear of the target gearshift after opening the clutch.

8. A method according to claim 1, further comprising:
   determining to conduct no gearshift when neither the transmission brake of the automatic transmission nor the drive unit nor the clutch is capable of bearing the determined load.

9. A method according to claim 1, wherein, when the gearbox-sided auxiliary output is activated or engaged, the target gearshift is conducted only if an inclination of the roadway on which the motor vehicle is operated is smaller than an applicable limit value.

* * * * *